United States Patent [19]

Antonellis

[11] 4,439,107
[45] Mar. 27, 1984

[54] ROTOR BLADE COOLING AIR CHAMBER

[75] Inventor: Stephen M. Antonellis, Hebron, Conn.

[73] Assignee: United Technologies Corporation, Hartford, Conn.

[21] Appl. No.: 418,860

[22] Filed: Sep. 16, 1982

[51] Int. Cl.³ .............................................. F01D 5/08
[52] U.S. Cl. .................... 416/95; 416/193 A; 416/220 R; 415/115
[58] Field of Search .............. 416/90, 95, 193 A, 220, 416/92, 96, 97; 415/116, 115, 219 R

[56] References Cited

U.S. PATENT DOCUMENTS

| | | | |
|---|---|---|---|
| 2,568,726 | 9/1951 | Franz | 415/115 |
| 3,174,720 | 3/1965 | Sproule | 253/26 |
| 3,356,340 | 12/1967 | Bobo | 415/115 |
| 3,572,966 | 3/1971 | Borden | 416/95 |
| 3,644,058 | 2/1972 | Barnabei et al. | 416/95 |
| 3,728,042 | 4/1973 | Hugoson et al. | 416/95 |
| 3,814,539 | 6/1974 | Klompas | 416/95 |
| 3,853,425 | 12/1974 | Scalzo et al. | 416/95 |
| 3,947,145 | 3/1976 | Michel et al. | 415/219 R |
| 3,967,353 | 7/1976 | Pagnotta et al. | 29/156.8 R |
| 4,012,167 | 3/1977 | Noble | 416/95 |
| 4,063,845 | 12/1977 | Allen | 415/134 |
| 4,213,738 | 7/1980 | Williams | 416/95 |
| 4,236,869 | 12/1980 | Laurello | 416/95 |

FOREIGN PATENT DOCUMENTS 998541 4/1965 United Kingdom .................. 416/95

Primary Examiner—Stephen Marcus
Assistant Examiner—John Kwon
Attorney, Agent, or Firm—Robert C. Walker

[57] ABSTRACT

A turbine rotor assembly 10 for providing cooling air to a turbine blade 28 is disclosed. An annulus 24 is formed between the rotor disk 12 and a segmented sideplate 20 in which the segments have overlapping ends 22. A thin flexible metal strip 36 having overlapping ends 38 is disposed about the radially inward edge of the sideplate segments to seal the leakage flowpath between the overlapping ends 22 of the sideplate segments 20 as the sideplate segments expand and contract with the supporting disk 12.

6 Claims, 1 Drawing Figure

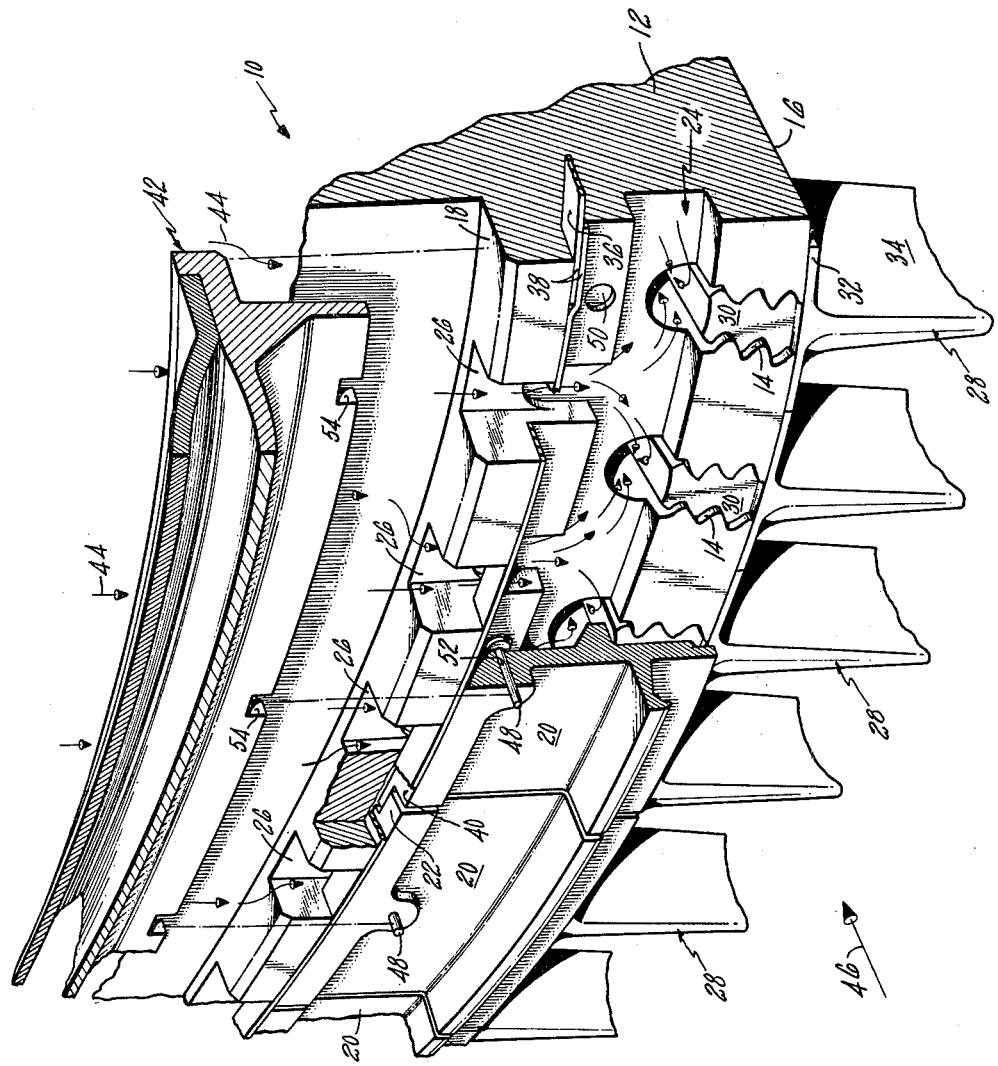

ROTOR BLADE COOLING AIR CHAMBER

DESCRIPTION

TECHNICAL FIELD

This invention relates to gas turbine engines, and more particularly to the distribution of cooling air to the rotor blades in the turbine section of such an engine.

BACKGROUND ART

In gas turbine engines of the type in which the present concepts were developed, working medium gases are compressed within a compression section and used as an oxidizing agent in the production of a high temperature effluent. The high temperature effluent is subsequently expanded through a turbine section. Within the turbine section blades extend outwardly across the flowpath for working medium gases to extract energy from the gases flowing thereacross. The temperature of the working medium gases flowing through the turbine section in modern engines is on the order of and may even locally exceed twenty-five hundred degrees Fahrenheit (2500° F.). Limiting the temperature of the metal from which the blades are fabricated is extremely critical in order to preserve material strength in the face of high centrifugal loads and to prevent local material deterioration.

The source of cooling air for the rotor blades is the compression section of the engine. High pressure relatively cooled gases are flowed through the interior of the engine to the region of the turbine rotor section and radially outwardly to the rim region of the disk for distribution to the individual rotor blades. U.S. Pat. Nos. 3,728,042 to Hugoson et al entitled "Axial Positioner and Seal for Cooled Rotor Blade"; 3,814,539 to Klompas entitled "Rotor Sealing Arrangement for an Axial Flow Fluid Turbine"; 3,853,425 to Scalzo et al entitled "Turbine Rotor Blade Cooling and Sealing System"; 4,213,738 to Williams entitled "Cooling Air Control Valve"; and 4,236,869 to Laurello entitled "Gas Turbine Engine Having Bleed Apparatus with Dynamic Pressure Recovery" are representative of the myriad of technical concepts employed in the distribution of cooling air to the rotor blades. In each of the above constructions a chamber for distribution of cooling air is formed between a blade supporting disk and adjacent structure affixed thereto.

Notwithstanding the availability of these concepts and others described in literature, scientists and engineers continue to search for techniques capable of judiciously distributing cooling air to the rotor blades.

DISCLOSURE OF THE INVENTION

According to the present invention an annular chamber for the distribution of cooling air to the roots of turbine rotor blades is formed between a rotor disk and a plurality of circumferentially adjacent, sideplate segments which are sealed at the radially inward edges thereof by a flexible metal strip with overlapping ends to accommodate radial expansion of the sideplate segments against which the strip seats.

Principal features of the present invention include the sideplate segments and the circumferentially extending metal strip. The sideplates are radially positioned by the disk in response to thermal changes in the disk environment. Circumferentially adjacent ends of the sideplate segments overlap to provide axial sealing across the sideplates. The circumferentially extending strip seats against the radially inward ends of the sideplate segments to provide radial sealing between abutting ends of the sideplate segments. The ends of the strip are overlapped to accommodate variations in the developed length of the composite surface formed by the inwardly facing edges of the sideplates segments against which the strip seats.

A principal advantage of the present invention is the ability of the structure to maintain effective sealing of the cooling air chamber notwithstanding radial displacements of the supporting disk in response to thermal variations and centrifugal force over the operating cycle of the engine in which the structure is installed. Axial sealing across the adjacent sideplate segments is maintained by the overlapping sideplate ends. Warpage of the strip is overcome by centrifugal force as the strip is urged against the inwardly facing sideplate ends. Variation in the width of the gap between adjacent sideplate segments is accommodated by the overlapped ends of the strip.

The foregoing features and advantages of the present invention will become more apparent to the light of the following detailed description of the best mode for carrying out the invention and in the accompanying drawing.

BRIEF DESCRIPTION OF THE DRAWING

FIG. 1 is a simplified partial perspective view of a portion of the turbine section of a gas turbine engine.

BEST MODE FOR CARRYING OUT THE INVENTION

A turbine rotor assembly 10 constructed in accordance with the present invention is illustrated in the FIG. 1 partial perspective view. The rotor assembly 10 is constructed principally of a rotor disk 12 and having a plurality of circumferentially spaced attachment slots 14 at the rim 16 of the disk. A ridge 18 extends around the disk rim at a point inwardly of the attachment slots. A plurality of sideplate segments 20 having shiplapped ends 22 are disposed about the rotor disk 12 and are spaced apart therefrom to form an annular cooling air chamber 24 between the sideplate segments and the rotor. A plurality of cooling air channels 26 are cut into the ridge 18 and extend radially across the channels. A plurality of coolable turbine blades 28 extend one each from a corresponding attachment slot on the disk. Each blade is formed of a root section 30, a platform section 32 and an airfoil section 34. A flexible metal strip 36 having overlapping ends 38 is disposed circumferentially between the inwardly facing edges 40 of the sideplate segments and the ridge. An interstage seal 42 is disposed radially between a source of cooling air 44 and the flowpath for working medium gases 46. An antirotation pin 48 partially imbedded in corresponding recesses 50 in the rotor disk extend laterally from the disk through corresponding holes 52 in the sideplate segments and through corresponding notches 54 in the interstage seal.

During operation of the engine in which turbine rotor assembly 10 is installed, the working medium gases are compressed in a compression section and used in the oxidation of fuel in a combustion section to produce high temperature effluent. Effluent temperatures on the order of two thousand degrees Fahrenheit (2000° F.) or greater are common. The high temperature gases thus produced are then flowed into the turbine rotor section of the jet engine where the turbine blades 28 extract energy from the working medium gases. This energy is then transferred through a plurality of rotor disks 12 to drive at least one drive shaft which in turn drives the compressor section of the jet engine and the fan if the jet engine is a fan jet.

In order to protect the turbine blades 28 from the deleterious effects of the hot working medium gases, cooling air is flowed through intricate passages at the interior of the blades. Cooling air for this purpose is flowed from the cooling air cavity 24 which is radially inward of the working medium gas path. The cooling air source 44 is controllable and supplied to the cooling air cavity from the compressor section of the jet engine. The cooling air remains at a substantially higher pressure than the working medium gases of the engine flowpath, perhaps on the order of twenty-five percent (25%) higher. The cooling air is centrifugally pumped from the cooling air source, across the channels 26 and into the annular chamber 24.

Sideplate segments 20 are used to axially retain the turbine blades 28 by preventing the root sections 30 of the turbine blades from translating. The sideplate segments are subjected to various forces that tend to rotate the sideplate in relation to the face of the disk 12. An antirotation pin 48 is placed in a hole 52 in the sideplate segment and engages a corresponding recess 50 in the turbine disk and a notch 54 in the interstage seal.

The cooling air chamber 24 is formed by spacing the sideplate segments 20 apart from a portion of the disk. The sideplate segments forming the chamber have shiplapped ends 22 which overlap the adjacent sideplate segment ends in accommodation of the growth and shrinkage of the turbine rotor disk due to the centrifugal force and changes in the thermal environment. The overlapping shiplapped ends prevent axial leakage of cooling air from the cooling chamber 24 and also prevent the hot working medium gases from reaching the attachment slots 14 and heating up the root section 30 of the turbine blade 28.

The cooling air flowing from the cooling air channels 26 must be directed into the cooling chamber. The space between adjacent sideplate segments provide a potential leakage path cooling air flowing radially outward between the interstage seal and the disk. A thin flexible strip of metal 36 having slidably overlapping ends 38 is disposed inwardly of the sideplate segments to close the potential leakage path. The circumference defined by the sideplate segments tends to develop irregularities because of the shifting of the sideplates and deterioration of their surfaces. The seal is thin and flexible and has slidably overlapped ends so that it can conform to any irregularities in the surface it is sealing, irrespective of the developed length of the surface. The strip responds quickly to changes in the size of the sideplate segments. Seal thicknesses on the order of one to twenty thousandths (0.001-0.020) inches are effective for most embodiments with ten thousandths (0.010) of an inch being an effective compromise between flexibility, durability, and handleability.

In some environments the high temperature to which the seal is exposed causes it to warp. The seal is designed thin enough and is disposed against the sideplate in such a manner that centrifugal forces due to the rotation of the rotor assembly 10 smooth out any warpage that may tend to develop. Furthermore centrifugal forces help seat the seal against the side plate segments.

Although the invention has been shown and described with respect to detailed embodiments thereof, it should be understood by those skilled in the art that various changes in form and detail thereof may be made without departing from the spirit and the scope of the claimed invention.

I claim:

1. A turbine rotor assembly, comprising
   a rotor disk having a plurality of circumferentially spaced slots extending across the rim of the disk at the periphery thereof;
   a plurality of rotor blades one each extending from a corresponding slot on the disk;
   a plurality of sideplate segments disposed in overlapping end to end relationship circumferentially about the rotor disk and spaced axially from a portion of the rotor disk to form a chamber for rotor blade cooling air therebetween; and
   a flexible strip having overlapping ends disposed inwardly of the sideplate segments and adapted to seat against the inwardly facing ends of said sideplate segments to seal radially extending gaps between each pair of adjacent sideplate segments.

2. The invention according to claim 1 wherein said strip is sufficiently flexible to conform under centrifugal force loading to irregularities in the circumferential surface formed by the edges of said sideplate segments.

3. The invention according to claim 1 wherein said flexible strip is sufficiently flexible to allow the centrifugal and pressure forces to smooth out thermally developed warpage in said flexible seal that develops during engine operation.

4. The invention according to claim 2 wherein said flexible strip is fabricated of metal having a thickness on the order of one thousandth to twenty thousandths of an inch.

5. The invention according to claim 4 wherein said flexible strip is fabricated of metal having a thickness of ten thousandths of an inch.

6. The invention according to claim 1 wherein the rotor disk has a lateral ridge extending circumferentially about the rotor disk in proximity to the sideplate segments and having one or more channels cut thereacross in communicaton with the cooling air chamber, the rotor assembly further including
   an interstage seal engaging the ridge and radially restrained thereby wherein cooling air inwardly of said interstage seal is flowable across the ridge to the blade cooling air chamber.

* * * * *